United States Patent
Chen et al.

(10) Patent No.: US 10,520,990 B2
(45) Date of Patent: Dec. 31, 2019

(54) ELECTRONIC DEVICE

(71) Applicant: Acer Incorporated, New Taipei (TW)

(72) Inventors: Hung-Chi Chen, New Taipei (TW);
Huei-Ting Chuang, New Taipei (TW);
Shun-Bin Chen, New Taipei (TW);
Kai-Yu Chuang, New Taipei (TW);
Yen-Chieh Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/359,974

(22) Filed: Mar. 20, 2019

(65) Prior Publication Data
US 2019/0369677 A1 Dec. 5, 2019

(30) Foreign Application Priority Data

Jun. 1, 2018 (TW) .............................. 107207340 U
Sep. 7, 2018 (TW) .............................. 107212305 U

(51) Int. Cl.
*G06F 1/16* (2006.01)
*G06F 1/20* (2006.01)

(52) U.S. Cl.
CPC .......... *G06F 1/1681* (2013.01); *G06F 1/1656* (2013.01); *G06F 1/203* (2013.01)

(58) Field of Classification Search
CPC ...... G06F 1/1656; G06F 1/166; G06F 1/1681; G06F 1/203
USPC ............ 361/679.27, 679.46, 679.47, 679.55, 361/679.59
See application file for complete search history.

(56) References Cited

U.S. PATENT DOCUMENTS

| | | | | |
|---|---|---|---|---|
| 6,437,978 B1 * | 8/2002 | Ozaki | ..................... | G06F 1/203 165/104.33 |
| 8,619,415 B1 * | 12/2013 | Lam | ..................... | G06F 1/1681 361/679.26 |
| 9,740,253 B2 * | 8/2017 | Cheng | ..................... | G06F 1/203 |
| 10,149,405 B2 * | 12/2018 | Chou | ..................... | G06F 1/203 |
| 10,289,176 B1 * | 5/2019 | Chen | ..................... | G06F 1/203 |
| 2010/0002379 A1 * | 1/2010 | Hadad | ................... | G06F 1/1616 361/679.59 |
| 2013/0327507 A1 * | 12/2013 | Degner | ................... | G06F 1/203 165/120 |

FOREIGN PATENT DOCUMENTS

| | | |
|---|---|---|
| TW | I318552 | 12/2009 |
| TW | I489927 | 6/2015 |
| TW | I539886 | 6/2016 |

* cited by examiner

*Primary Examiner* — Anthony Q Edwards
(74) *Attorney, Agent, or Firm* — Belinda Lee

(57) ABSTRACT

An electronic device includes a first body, a hinge structure, a second body, a cover plate, a fulcrum, a lever element, a stand and a second gear. The first body has a convection groove and an accommodation groove. The hinge structure includes a driving element and a first gear arranged at the first body. The second body is pivoted to the first body through the hinge structure. The cover plate is movably disposed at the first body. The fulcrum is disposed at the first body. The lever element is pivoted to the fulcrum, wherein the lever element includes a first end and a second end. The driving element abuts against the first end, and the second end is movably coupled to the cover plate. The stand is movably disposed at the first body. The second gear is connected to the stand and coupled to the first gear.

20 Claims, 6 Drawing Sheets

ELECTRONIC DEVICE

CROSS-REFERENCE TO RELATED APPLICATION

This application claims the priority benefits of Taiwan application serial no. 107207340, filed on Jun. 1, 2018, and Taiwan application serial no. 107212305, filed on Sep. 7, 2018. The entirety of each of the above-mentioned patent application is hereby incorporated by reference herein and made a part of specification.

BACKGROUND

Technical Field

The disclosure relates to an electronic device, and more particularly to an electronic device with improved heat dissipation capability.

Description of Related Art

The computing performance and the portability of laptop computers have made them indispensable for people nowadays. As the computing performance of the laptop computers keeps increasing, the heat generated by electronic components (such as a central processing unit, a graphic chip, or a display chip) operating inside the laptop computers is also on the increase. Because the overheating of the laptop computers might result in temporary or permanent malfunction, cooling fans are commonly utilized to draw cooler air from and expel warmer air to the outside of the computers. Therefore, a plurality of apertures are often disposed on a chassis of the laptop computer for the airflow induced by the cooling fan to pass through.

It is, however, not feasible to improve the heat dissipation by disposing many apertures on the computer chassis. Foreign objects and moisture may easily enter the computer chassis via the apertures and damage the components of the computers. On the other hand, the heat dissipation capability may seriously degrade without enough apertures.

SUMMARY

The disclosure provides an electronic device with improved heat dissipation capability.

The electronic device according to the disclosure includes a first body, a hinge structure, a second body, a cover plate, a fulcrum, a lever element, a stand and a second gear. The first body has a convection groove and an accommodation groove. The hinge structure includes a driving element and a first gear arranged side by side at the first body. The second body is pivoted to the first body through the hinge structure. The cover plate is movably disposed at the first body and configured to optionally hide the convection groove. The fulcrum is disposed at the first body. The lever element is pivoted to the fulcrum, wherein the lever element includes a first end and a second end opposite to each other. The driving element abuts against the first end, and the second end is movably coupled to the cover plate. The stand is movably disposed at the first body and configured to move out of or back into the accommodation groove. The second gear is connected to the stand and coupled to the first gear. When the second body pivots on the first body, the driving element rotating along with the second body drives the first end to allow the lever element to rotate relative to the fulcrum, the cover plate is driven by the second end of the lever element to move relative to the first body, and the first gear rotating along with the second body drives the second gear to allow the stand to move relative to the first body.

The electronic device according to the disclosure includes a first body, a hinge structure, a second body, a cover plate, a fulcrum, a lever element and a stand. The first body has a convection groove and an accommodation groove. The hinge structure is disposed at the first body. The second body is pivoted to the first body through the hinge structure. The cover plate is movably disposed at the first body and configured to optionally hide the convection groove. The fulcrum is disposed at the first body. The lever element is pivoted to the fulcrum, wherein the lever element includes a first end and a second end opposite to each other. The hinge structure abuts against the first end and the second end is movably coupled to the cover plate, wherein the lever element is configured to be driven by the hinge structure to rotate relative to the fulcrum and the cover plate is driven by the second end to move relative to the first body. The stand is movably disposed at the first body and configured to be driven by the hinge structure to move out of or back into the accommodation groove.

In view of the above, when the second body pivots on the first body, the driving element rotating along with the second body may drive the lever element and a gear set (including the first gear and the second gear) to move synchronously. Hence, the cover plate is driven by the lever element to move relative to the first body, and the stand is driven by the gear set to move relative to the first body. Further, when the second body is unfolded relative to the first body, the cover plate moves away from the first body to expose the convection groove out of the first body, and the stand moves out of the accommodation groove of the first body to enhance the circulation capability of the airflow inside and outside the first body and quickly expel the heat generated by the electronic device. The heat dissipation capability of the electronic device may therefore be improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
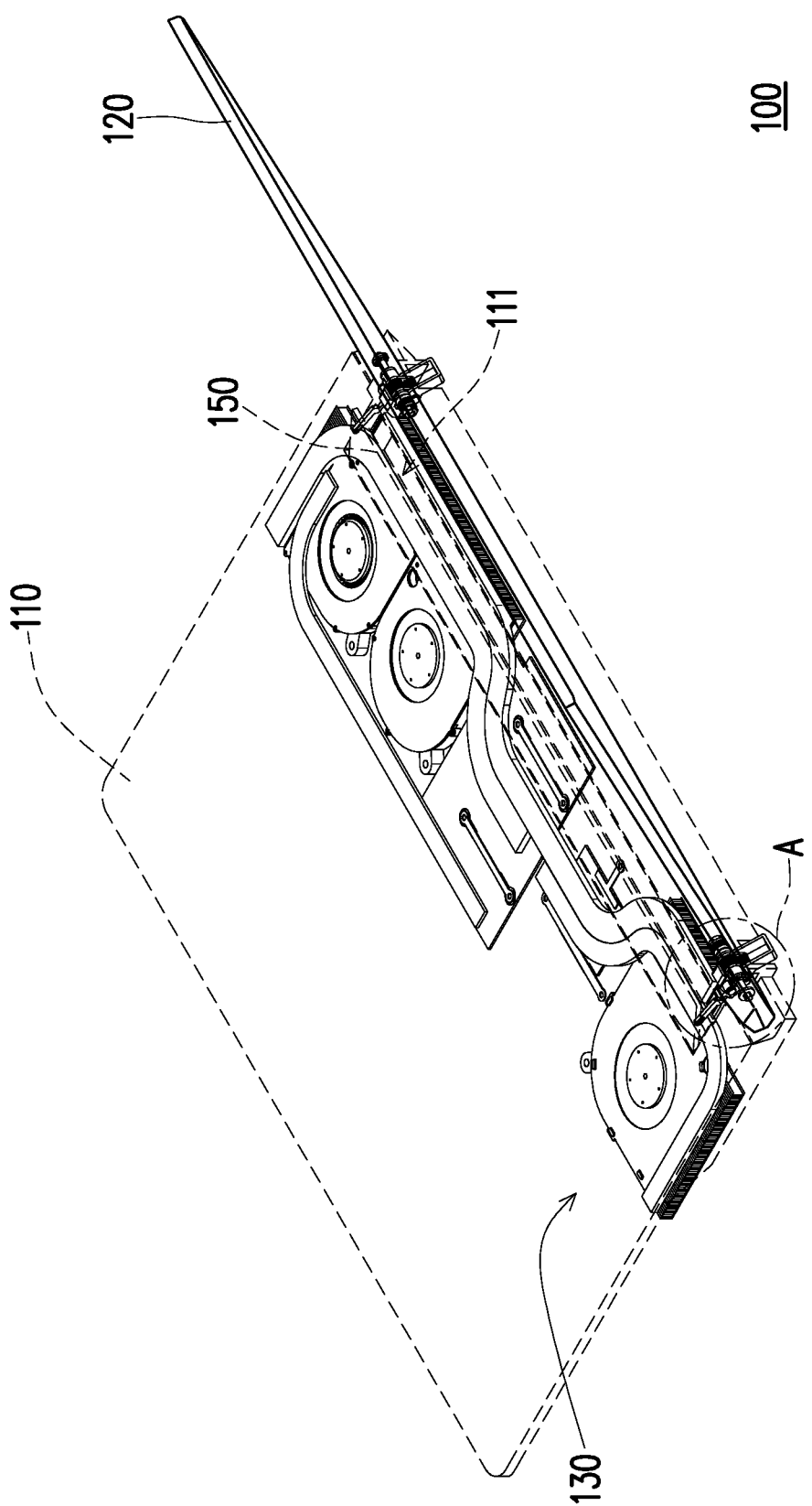
FIG. 1 is a schematic view of an electronic device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
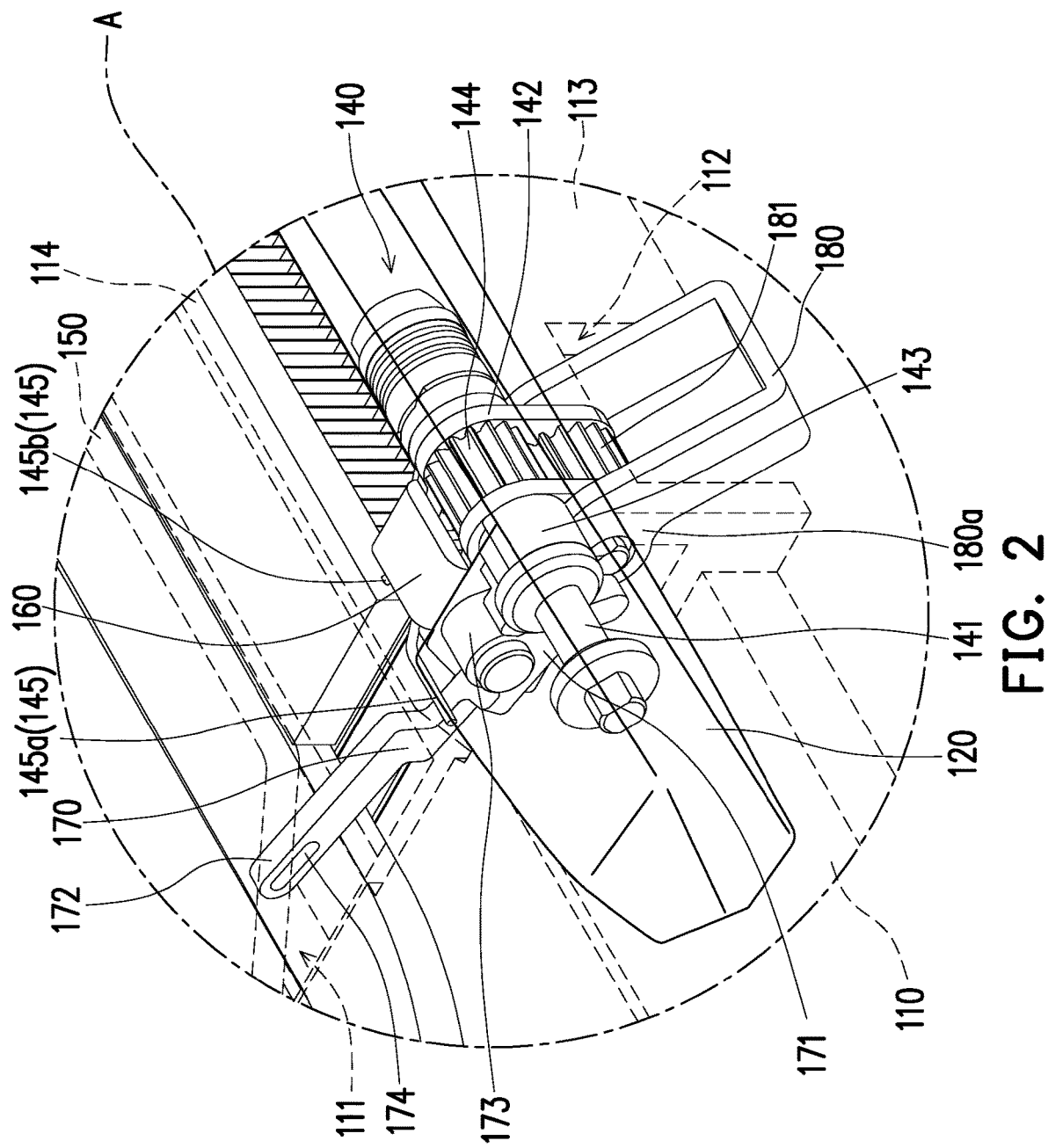
FIG. 2 is a partially enlarged schematic view of a region A of the electronic device of FIG. 1.
Figure 3:
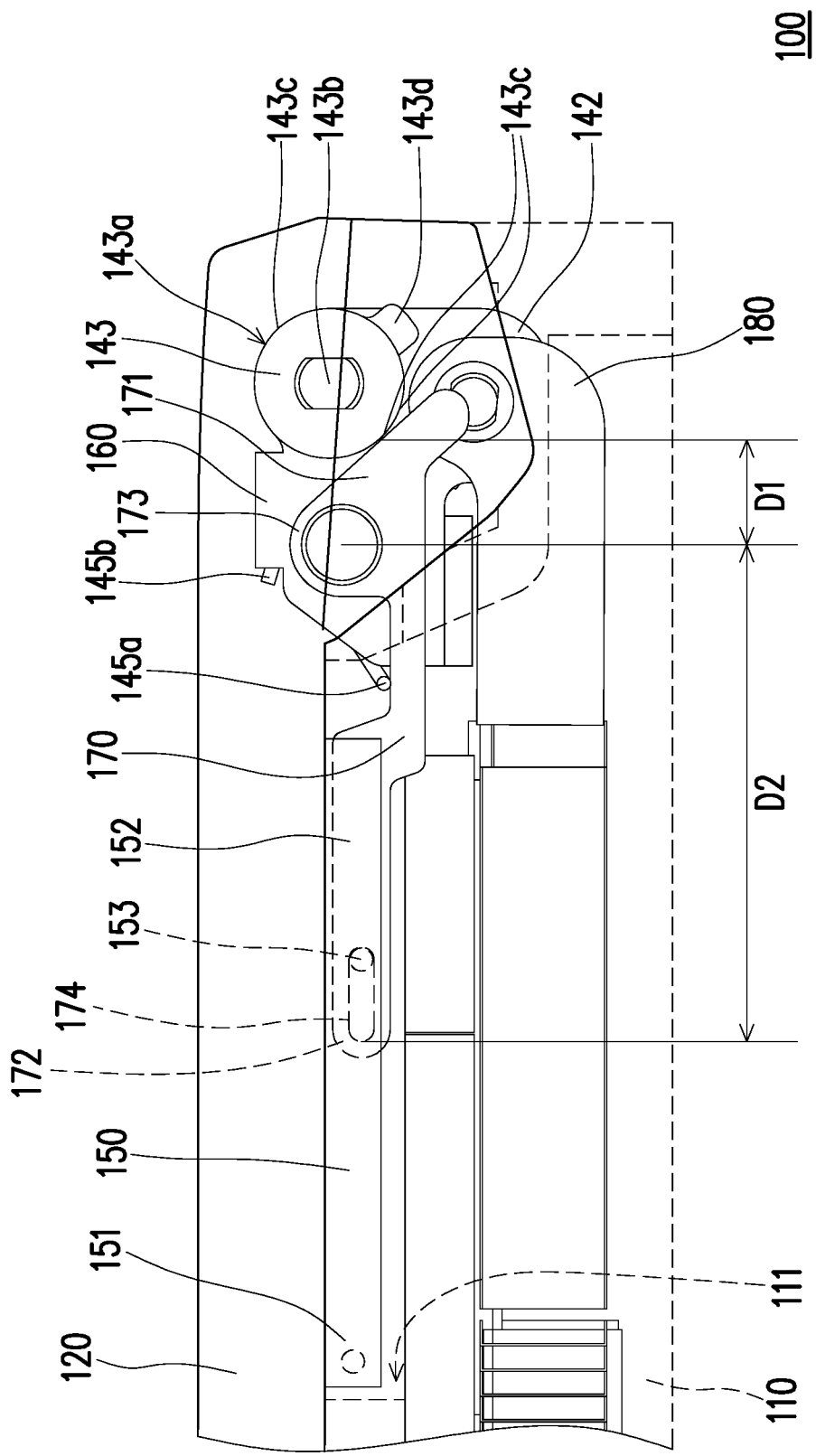
FIG. 3 is a partial enlarged schematic view of an electronic device that is in a folded state according to an embodiment of the disclosure.
Figure 4:
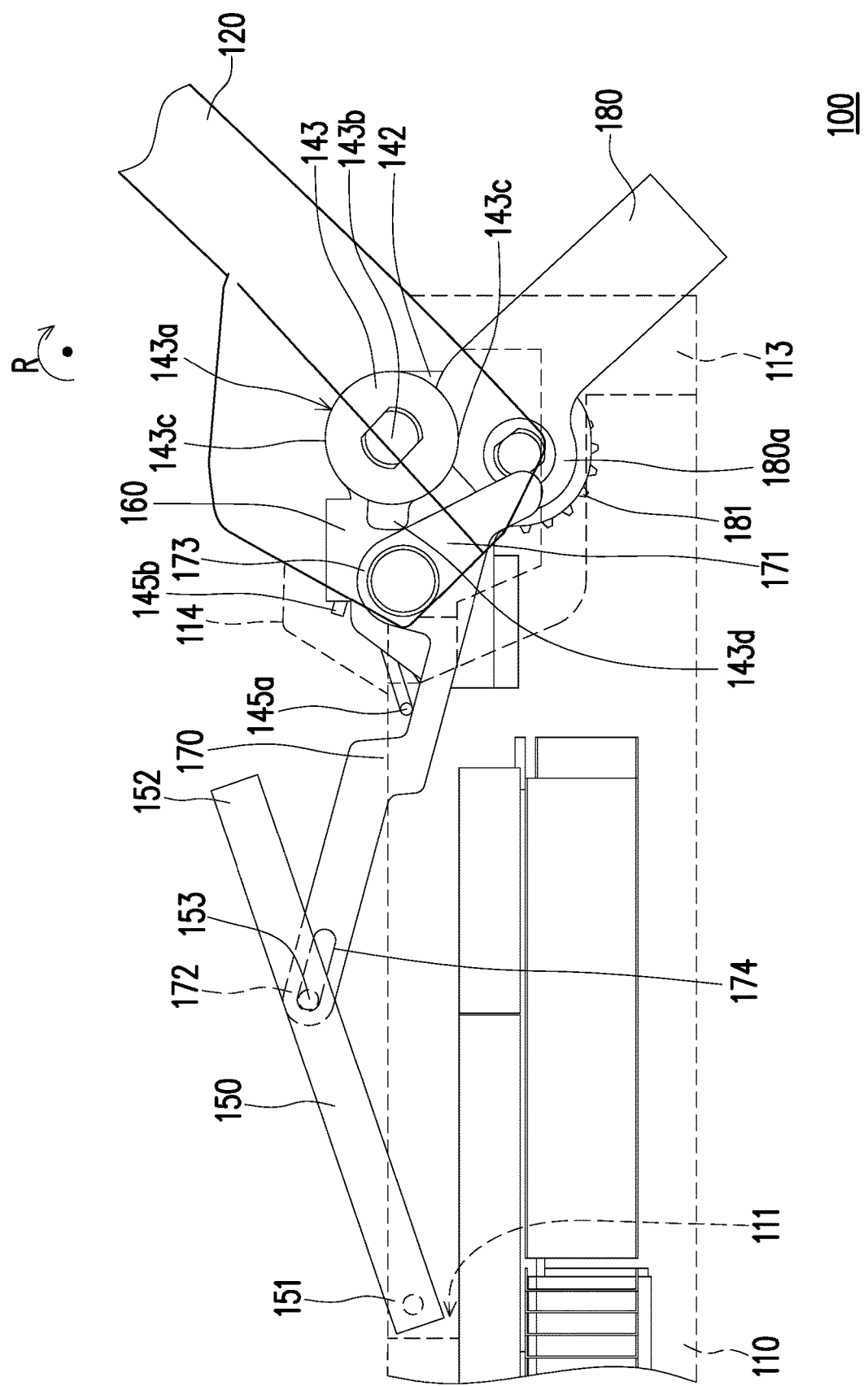
FIG. 4 is a partial enlarged schematic view of an electronic device that is in an unfolded state according to an embodiment of the disclosure.

FIG. 1 is a schematic view of an electronic device according to an embodiment of the disclosure. FIG. 2 is a partial enlarged schematic view of a region A of the electronic device of FIG. 1. FIG. 3 is a partial enlarged schematic view of an electronic device that is in a folded state according to an embodiment of the disclosure embodiment. FIG. 4 is a partial enlarged schematic view of an electronic device that is in an unfolded state according to an embodiment of the disclosure embodiment. It should be particularly stated that, in order to clearly demonstrate the structural configuration inside an electronic device 100, a first body 110 of FIGS. 1 to 4 is illustrated in broken lines, a second body 120 of FIGS. 1 to 4 is illustrated in a perspective manner, and a cover plate 150 of FIGS. 1 and 2 is illustrated in broken lines; therefore, the relative relationship between respective components is clearly demonstrated. Further, the electronic device 100 of FIGS. 1 and 4 is in an unfolded state. The first body 110 in the unfolded state does not abut against the second body 120, and an unfolded angle exists between the first body 110 and the second body 120.

Referring to FIGS. 1 and 2, in the embodiment, an electronic device 100 may be a laptop computer including the first body 110 and the second body 120 that are pivoted to each other. The first body 110 may be a host computer, and electronic components (not shown) such as a central processing unit, a graphics chip, or a display chip are disposed inside the first body 110. Moreover, the electronic components in operation generate heat. Therefore, a thermal module 130 is provided in the first body 110. The thermal module 130 may include a cooling fan, a heat pipe, a cooling plate, and so on, and the cooling fan is configured to cause forced convection to quickly expel the heat generated by the electronic device. Correspondingly, a convection groove 111 and an accommodation groove 112 for airflow to pass through are disposed at the first body 110 to boost the circulation capability of airflow to enhance the heat dissipation capability.

The electronic device 100 further includes a hinge structure 140, the cover plate 150, a fulcrum 160, a lever element 170, a stand 180 and a second gear 181. The second body 120 is pivoted to the first body 110 through the hinge structure 140. Further, the hinge structure 140 includes a shaft 141, a positioning frame 142, a driving element 143 and a first gear 144, wherein the two opposite ends of the shaft 141 are connected to the first body 110 and the second body 120 respectively and the positioning frame 142 is connected to the fulcrum 160. The positioning frame 142 and the fulcrum 160 may be integrally formed. The positioning frame 142 and the fulcrum 160 are fixed to the first body 110. The driving element 143 and the first gear 144 are arranged side by side at the first body 110, and the shaft 141 is inserted into the driving element 143, the first gear 144 and the positioning frame 142. Specifically, the first gear 144 and the driving element 143 are sleeved on and fixed to the shaft 141, and the shaft 141 retains the degree of freedom of movement for rotating relative to the positioning frame 142. On the other hand, the driving element 143 is disposed outside the positioning frame 142, and the first gear 144 is disposed in the positioning frame 142 and may be rotated relative to the positioning frame 142 through the shaft 141. Thus, when the second body 120 is rotated relative to the first body 110, the shaft 141, the driving element 143 and the first gear 144 can rotates synchronously relative to the positioning frame 142.

Referring to FIGS. 1 to 4, in the embodiment, the cover plate 150 is movably disposed at the first body 110 to optionally hide the convection groove 111. On the other hand, the stand 180 is movably disposed at the first body 110 and configured to move out of or back into the accommodation groove 112. The convection groove 111 and the accommodation groove 112 are both communicated with the inner space of the first body 110, and are configured to accommodate the cover plate 150 and the stand 180 respectively. When the electronic device 100 is in the folded state as shown in FIG. 3, the cover plate 150 moves into the convection groove 111 to prevent an excessively large gap existing between the first body 110 and the second body 120 abutting against each other due to the cover plate 150 protruding from the first body 110. Besides, the stand 180 moves back into the accommodation groove 112 to prevent the electronic device 100 being inclined with respect to a working plane (e.g., a desktop) due to the stand 180 protruding from the first body 110. Further, an inner profile of the convection groove 111 matches an outer profile of the cover plate 150, and an inner profile of the accommodation groove 112 matches an outer profile of the stand 180. In this manner, after the cover plate 150 moves into the convection groove 111, the cover plate 150 may block the passage between the outside and the inner space of the first body 110. The convection groove 111 may be completely covered by or at least partially exposed by the cover plate 150 depending on the different states of the electronic device 100.

As shown in FIGS. 2 and 4, after the cover plate 150 and the stand 180 moves out of the convection groove 111 and the accommodation groove 112, respectively, the stand 180 can support the electronic device 100 to make the electronic device 100 inclined with respect to the working plane (e.g., a desktop). On the other hand, the inner space of the first body 110 is communicated with the outside through the convection groove 111 and the accommodation groove 112 to boost the circulation capability of airflow within the inner space of the first body 110 to enhance the heat dissipation capability of the electronic device 100. That is, in the case where the inner space of the first body 110 is communicated with the outside through the convection groove 111, a flow rate of airflow can be significantly increased, whether it be the airflow entering the inner space of the first body 110 from the outside or the airflow expelled to the outside from the inner space of the first electrode body 110. In other words, when the user uses the electronic device 100, the cover plate 150 would remain unfolded to expose the convection groove 111, and the stand 180 can support the electronic device 100 to communicate the accommodation groove 112 of the first body 110 or the bottom opening with the outside, so there is sufficient amount of air entering or exiting for the thermal module 130 to enhance the heat dissipation capability.

Referring to FIGS. 1-4, an end 180a of the stand 180 is pivoted to the positioning frame 142, the second gear 181 is disposed in the positioning frame 142, and the first gear 144 is coupled to the second gear 181. Furthermore, the second gear 181 is connected to the end 180a of the stand 180, and the first gear 144 and the second gear 181 are arranged side by side in the positioning frame 142. When the second body 120 pivots on the first body 110, the second gear 181 is driven by the first gear 144 to rotate relative to the positioning frame 142, and the stand 180 is rotated relative to the positioning frame 142 along with the second gear 181 to move out or move back into the accommodation groove 112. A rotating direction of the first gear 144 is the same as a rotating direction of the second body 120, and rotating directions of the second gear 181 and the stand 180 are opposite to the rotating direction of the first gear 144.

The open/close mechanism of the cover plate 150 is described below. In the embodiment, the cover plate 150 is driven by the lever element 170. The lever element 170 is pivoted to the fulcrum 160 and includes a first end 171, a second end 172 and a pivot portion 173. The first end 171 and the second end 172 are opposite to each other, and the pivot portion 173 is located between the first end 171 and the second end 172. Further, the lever element 170 is pivoted to the fulcrum 160 through the pivot portion 173, the driving element 143 abuts against the first end 171, and the second end 172 is movably coupled to the cover plate 150. The first end 171 and the second end 172 can be rotated back and forth with respect to the fulcrum 160 based on the pivot portion 173. When the second body 120 is rotated relative to the first body 110, the driving element 143 rotating along with the second body 120 drives the first end 171 to allow the lever element 170 to rotate relative to the fulcrum 160, and the cover plate 150 is driven by the second end 172 to move relative to the first body 110. It should be particularly stated that a position in which the pivot portion 173 is pivoted to the fulcrum 160 is a pivot point of the lever element 170 on the fulcrum 160.

On the other hand, the cover plate 150 includes a pivot end 151, a motion end 152 opposite to the pivot end 151, and a coupling portion 153 located between the pivot end 151 and the motion end 152. The pivot end 151 is pivoted to the first body 110, and the pivot end 151 and the pivot portion 173 are respectively located at two opposite sides of the motion end 152. In this configuration, the cover plate 150 driven by the lever element 170 would experience a greater moving stroke. Further, the second end 172 of the lever element 170 has a sliding groove 174, and the coupling portion 153 is slidably disposed in the sliding groove 174. When the cover plate 150 is driven by the second end 172 to pivot on the first body 110, the coupling portion 153 may slide back and forth between the two opposite dead points of the sliding groove 174. In another embodiment, the sliding groove may also be disposed in the cover plate 150 with a corresponding coupling portion disposed in the lever element 170. This manner also achieves technical effects similar to the above embodiment.

In the embodiment, the driving element 143 has an abutting surface 143a and a rotating axle centre 143b surrounded by the abutting surface 143a. A plurality of distances between abutting points 143c on the abutting surface 143a and the rotating axle centre 143b are equal. That is to say, the abutting surface 143a is substantially a circular surface. Further, the driving element 143 further includes a protrusion portion 143d protruding from the abutting surface 143a. A distance between a point of the protrusion portion 143d abutting against the first end 171 and the rotating axle centre 143b is greater than distances between the abutting points 143c and the rotating axle centre 143b. During the transition from the folded state shown in FIG. 3 to the unfolded state shown in FIG. 4, the driving element 143 rotates along a rotating direction R. Before the protrusion portion 143d abuts against the first end 171 of the lever element 170, since the distances between the abutting points 143c on the abutting surface 143a and the rotating axle centre 143b are equal, the driving element 143 does not press down the first end 171 of the lever element 170. After the protrusion portion 143d abuts against the first end 171 of the lever element 170, the protrusion portion 143d press down the first end 171.

Further, based on the principle of leverage, the second end 172 of the lever element 170 is lifted subsequently and drives the cover plate 150 upward. At this time, the lever element 170 is rotated relative to the fulcrum 160 along the direction of rotation R, and the coupling portion 153 is guided by the sliding groove 174 of the second end 172 to slide away from the fulcrum 160 within the sliding groove 174 to drive the cover plate 150 to move relative to the first body 110. Further, the pivot end 151 serves as a rotating axis and the motion end 152 of the cover plate 150 rotates around the pivot end 151 to rotate away from the first body 110 along a direction opposite to the rotating direction R so as to expose the convection groove 111.

By contrast, during transition from the unfolded state shown in FIG. 4 to the folded state shown in FIG. 3, when the driving element 143 is rotated along a direction opposite to the rotating direction R, the protrusion portion 143d would be gradually away from the first end 171 of the lever element 170. At this time, the driving element 143 abuts against the first end 171 of the lever element 170 through the abutting surface 143a. Since changes in the geometric profile of the driving element 143 causes the first end 171 to be lifted, based on the principle of leverage, the second end 172 of the lever element 170 is down subsequently and drives the cover plate 150 downward to hide the convection groove 111. At this time, the lever element 170 is rotated relative to the fulcrum 160 along a direction opposite to the rotating direction R, and the motion end 152 of the cover plate 150 rotates along the rotating direction R to get close to the first body 110 with the pivot end 151 as a rotating axis.

In the embodiment, the hinge structure 140 further includes an elastic member 145, the elastic member 145 has a first abutting end 145a and a second abutting end 145b that are opposite to each other. The first abutting end 145a abuts against the lever element 170, and the second abutting end 145b abuts against the fulcrum 160. During the transition from the folded state shown in FIG. 3 to the unfolded state shown in FIG. 4, the lever element 170 is rotated relative to the fulcrum 160 along the rotating direction R and compresses the elastic member 145, and thus the elastic member 145 undergoes elastic deformation. With the elastic member 145, the user obtains rather firm handling of operation when unfolding the electronic device 100. During the transition from the unfolded state shown in FIG. 4 to the folded state shown in FIG. 3, the elastic member 145 restoring its elastic force may drive the lever element 170 to rotate relative to the fulcrum 160 along a direction opposite to the rotating direction R to ensure the lever element 170 restores to the folded state shown in FIG. 3. In the embodiment, a torsion spring may serve as the elastic member 145, but the disclosure is not limited thereto. In other embodiments, a compression spring may also serve as an elastic member.

On the other hand, the first body 110 includes a base 113 and a casing 114 disposed on the base 113. The driving element 143, the first end 171 and the fulcrum 160 are disposed between the casing 114 and the base 113. On the other hand, the cover plate 150 and the casing 114 are arranged side by side, and at least a portion of the lever element 170 between the casing 114 and the base 113 extends outward to be coupled to the cover plate 150 through the second end 172 disposed outside the casing 114. During the lever element 170 being rotated relative to the fulcrum 160 along the rotating direction R, the lever element 170 stops swinging when a section of the lever element 170 protruding from the casing 114 is structurally interfered with the casing 114. In other words, the casing 114 limits the moving stroke of the lever element 170 rotating relative to the fulcrum 160 along the rotating direction R.

A distance D1 between the pivot portion 173 and the first end 171 is smaller than a distance D2 between the pivot portion 173 and the second end 182. Based on the principle of leverage, when a user applies force to the second body 120 to allow the second body 120 to pivot on the first body 110, it requires a larger force being applied to the second body 120 to enable the driving element 143 to drive the lever element 170 to rotate relative to fulcrum 160. In this way, the user may not only obtain rather firm handling of operation, but the second body 120 may also be prevented from being unfolded easily relative to the first body 110. On the other hand, a coupling point of the second end 182 on the cover plate 160 is relatively farther away from the pivot end 161. Thus, with a greater lever arm, a process of unfolding the cover plate 150 (i.e. allowing the cover plate 150 to rotate away from the first body 110 along a direction opposite to the rotating direction R to expose the convection groove 111) may go more smoothly. Further, since the distance D2 between the pivot portion 173 and the second end 172 is greater than the distance D1 between the pivot portion 173 and the first end 171, the cover plate 150 driven by the second end 172 may experience a greater lifting stroke. In another embodiment, the values of the distance D1 and the distance D2 may also be adjusted according to different needs for design.

In the embodiment, the hinge structure 140, the driving element 170, the fulcrum 160, the stand 180 and the second gear 180 are disposed into a group, and the number of groups is two and are respectively disposed at two opposite sides of the cover plate 150. The configuration enhances the stability of the second body 120 pivoting on the first body 110 while enhancing the stability and reliability of the cover plate 150 pivoting on the first body 110. In other embodiments, a number of the groups containing the hinge structure, the lever element, the fulcrum, the stand and the second gear may be one, and the group is disposed at a single side of the cover plate.

Other embodiments will be illustrated below, the description for the same components, configurations and operating principles may be referred to the description of the above embodiments and would not be described repeatedly below.

Figure 5:
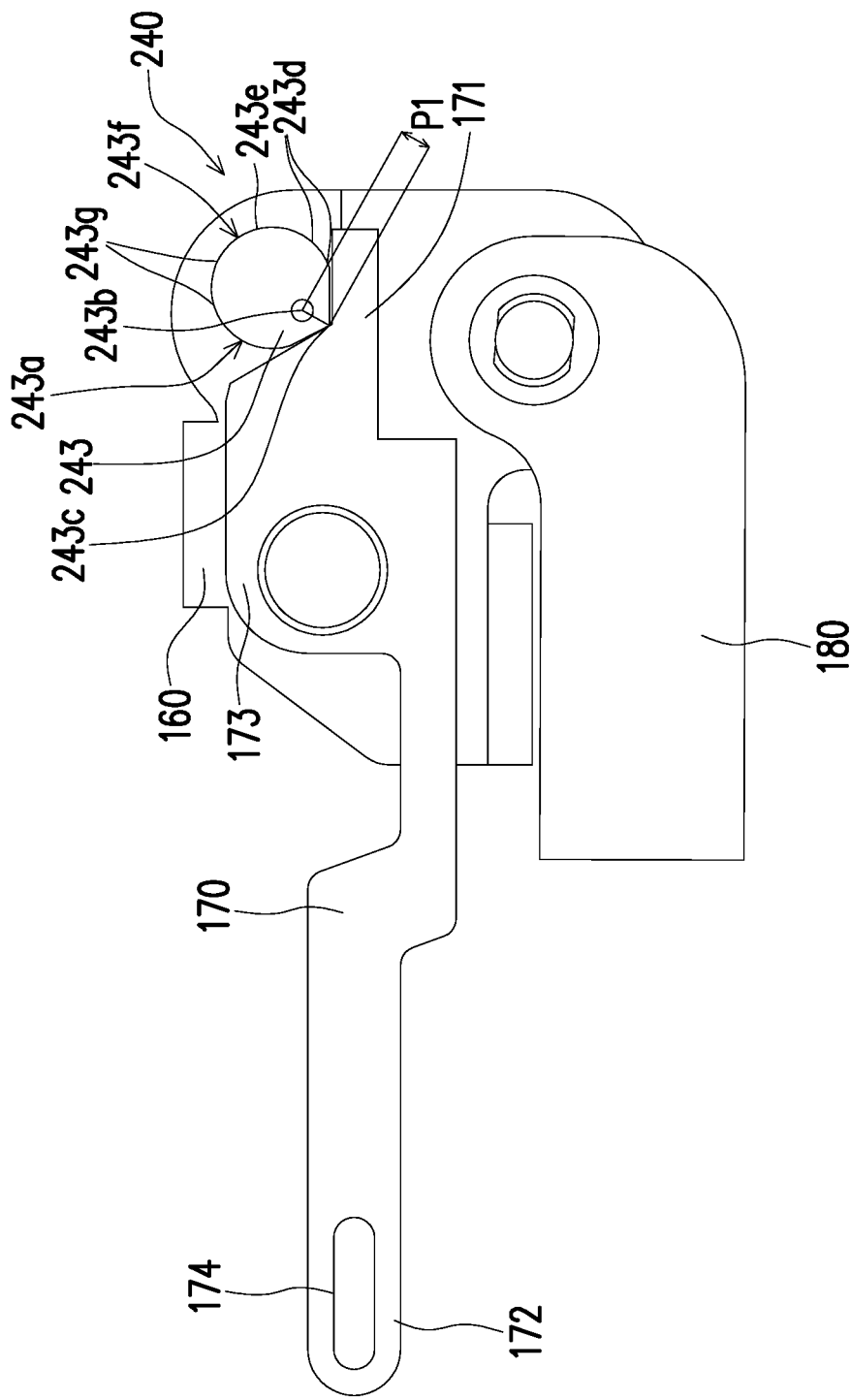
FIGS. 5 and 6 are respectively partial enlarged schematic views of a hinge structure and a lever element that are in different states according to another embodiment of the disclosure.
Figure 6:
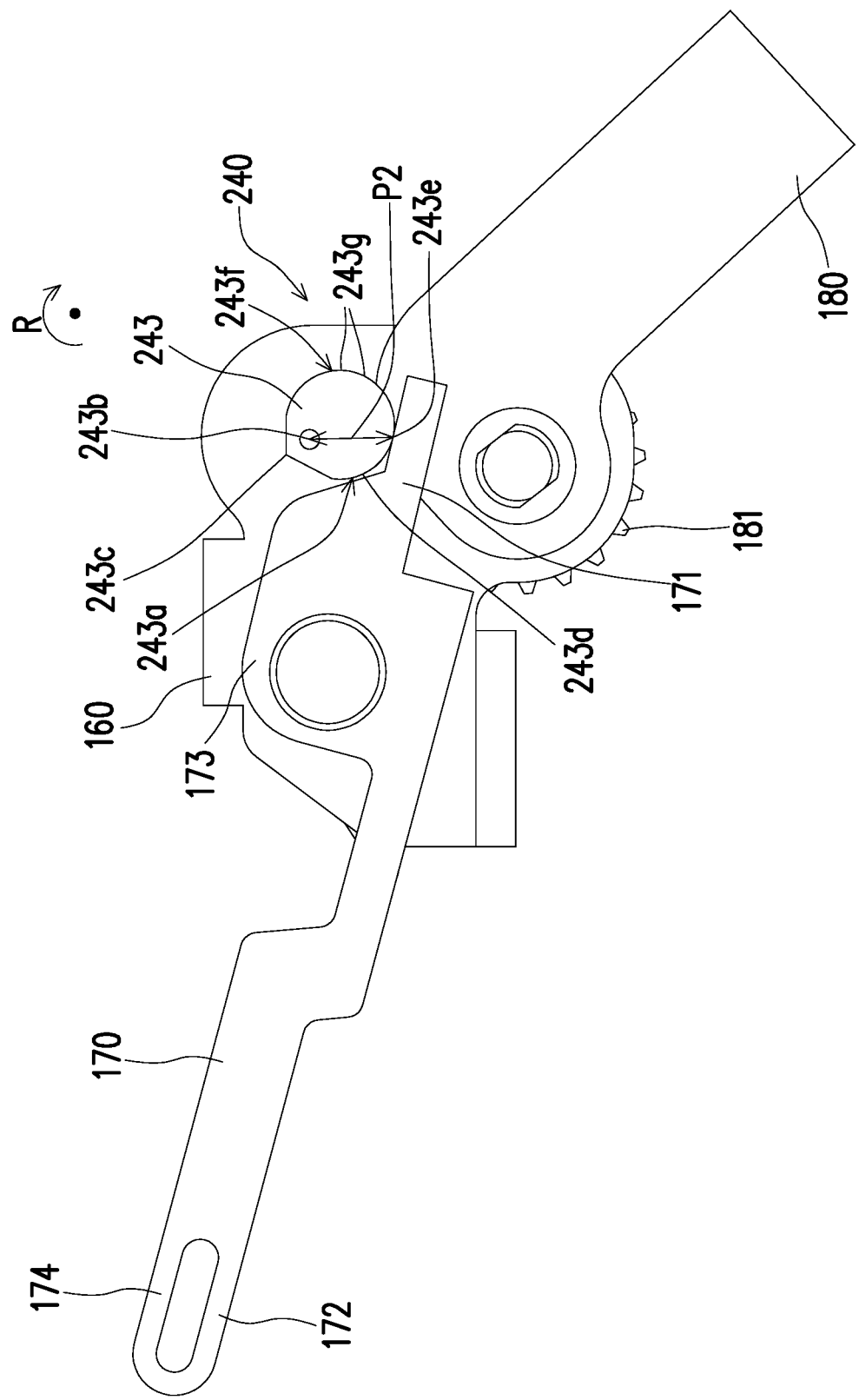

FIGS. 5 and 6 are respectively partial enlarged schematic views of a hinge structure and a lever element that are in different states according to an embodiment of the disclosure. To clearly demonstrate the abutting relationship between the cam (i.e. a driving element 243) and the lever element 170, some components are omitted from FIGS. 5 and 6. Referring to FIGS. 5 and 6, in the embodiment, the hinge structure 240 can be applied to the electronic device 100 of the previous embodiment. The difference from the hinge structure 140 of the previous embodiment is that a cam may serve as the driving element 243 of the embodiment and has an abutting surface 243a and a rotating axle centre 243b surrounded by the abutting surface 243a. When the electronic device (not shown) is in the folded state shown in FIG. 5, the abutting surface 243a of the driving element 243 abuts against the first end 171 of the lever element 170 through a first abutting point 243c, and a distance P1 is provided between the rotating axle centre 243b and the first abutting point 243c.

During the transition of the electronic device (not shown) from the folded state shown in FIG. 5 to the unfolded state shown in FIG. 6, the driving element 243 is rotated relative to the first body (not shown) along the rotating direction R, and the abutting surface 243b abuts against the first end 171 of the lever element 170 through other abutting points 243d which are different from the first abutting point 243c sequentially until the abutting surface 243a abuts against the first end 171 of the lever element 170 through a second abutting point 243e. Further, a distance P2 is provided between the rotating axle centre 243b and the second abutting point 243e. The distance P2 is greater than the distance P1, and a plurality of distances between the other abutting points 243d that are located between the first abutting point 243c and the second abutting point 243e and the rotating axle centre 243b increase gradually from the first abutting point 243c toward the second abutting point 243e. Accordingly, the driving element 243 rotating along the rotating direction R may continue to press down the first end 171 of the lever element 170 to allow the lever element 170 to rotate relative to the fulcrum 160 along the rotating direction R and to drive the cover plate (not shown) to rotate away from the first body (not shown) along a direction opposite to the rotating direction R to expose the convection groove (not shown).

In some embodiments, when the abutting surface 243a of the driving element 243 abuts against the first end 171 of the lever element 170 through the second abutting point 243e, since a section of the lever element 170 protruding from the casing (not shown) is structurally interfered with the casing (not shown), the lever element 170 does not continue swinging even though the driving element 243 continuously rotates along the rotating direction R. In addition, a sliding stroke of the coupling portion (not shown) of the cover plate (not shown) in the sliding groove 174 of the second end 172 of the lever element 170 may also limit a rotating stroke of the lever element 170 or a rotating stroke of the cover plate (not shown).

In other embodiments, in another section of the abutting surface 243a that is different from the section between the first abutting point 243c and the second abutting point 243e and follows the second abutting point 243e, the abutting surface 243a has an arc section 243f. If the driving element 243 rotates along the rotating direction R continuously, the abutting surface 243a abuts against the first end 171 of the lever element 170 through the arc section 243f. Moreover, a plurality of distances between abutting points 243g on the arc section 243f and the rotating axle centre 243b are equal to the distance P2. Accordingly, even though the driving element 243 rotates along the rotating direction R continuously after abutting against the first end 171 of the lever element 170 through the second abutting point 243e, the driving element 243 would not further press down the first end 171 of the lever element 170.

By contrast, during the transition of the electronic device (not shown) from the unfolded state shown in FIG. 6 to the folded state shown in FIG. 5, the distances between the abutting points 243d on the abutting surface 243a of the driving element 243 and the rotating axle centre 243b decrease gradually from the second abutting point 243e toward the first abutting point 243c. At this time, the first end 171 of the lever element 170 is lifted with changes in the outer profile of the driving element 243. Based on the principle of leverage, the second end 172 moves down subsequently and drives the cover plate (not shown) downward. Further, the lever element 170 rotates relative to the fulcrum 160 along a direction opposite to the rotating direction R to drive the cover plate (not shown) to rotate along the rotating direction R to get close to the first body (not shown) to hide the convection groove (not shown).

In view of the foregoing, when the second body rotates relative to the first body, the driving element rotating along with the second body may drive the lever element and the gear set (including the first gear and the second gear) to move synchronously. Hence, the cover plate is driven by the lever element to move relative to the first body, and the stand is driven by the gear set to move relative to the first body. Further, when the second body is unfolded relative to the first body, the cover plate moves away from the first body to expose the convection groove of the first body, and the stand moves out of the accommodation groove of the first body and supports the electronic device. In this way, the circulation capability of the airflow inside and outside the first body improves and the heat generated by the electronic device is expelled quickly. In other words, the electronic device according to the disclosure has improved heat dissipation capability. On the other hand, when the second body is folded to the first body, the cover plate moves close to the first body and hides the convection groove of the first body. Therefore, when the electronic device is in the folded state, foreign materials or moisture from the outside cannot easily enter the first body through the convection groove, and the entire appearance of the electronic device may also be maintained. On the other hand, the stand can move back into the accommodation groove of the first body to put the electronic device on the working plane, such as a desktop, in a flat position.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a first body, having a convection groove and an accommodation groove;
   a hinge structure, comprising a driving element and a first gear arranged side by side at the first body;
   a second body, pivoted to the first body through the hinge structure;
   a cover plate, movably disposed at the first body and configured to optionally hide the convection groove;
   a fulcrum, disposed at the first body;
   a lever element, pivoted to the fulcrum, wherein the lever element comprises a first end and a second end opposite to each other, the driving element abuts against the first end and the second end is movably coupled to the cover plate;
   a stand, movably disposed at the first body and configured to move out of or back into the accommodation groove; and
   a second gear, connected to the stand and coupled to the first gear,
   wherein when the second body pivots on the first body, the driving element rotating along with the second body drives the first end to allow the lever element to rotate relative to the fulcrum, the cover plate is driven by the second end to move relative to the first body, and the first gear rotating along with the second body drives the second gear to allow the stand to move relative to the first body.

2. The electronic device of claim 1, wherein the cover plate comprises a pivot end, a motion end opposite the pivot end and a coupling portion located between the pivot end and the motion end, the pivot end is pivoted to the first body, and the second end has a sliding groove, wherein the coupling portion is slidably disposed in the sliding groove, the pivot end and a pivot point of the lever element on the fulcrum are respectively located at two opposite sides of the motion end, and when the driving element rotating along with the second body drives the first end to allow the lever element to rotate relative to the fulcrum, and the cover plate is driven by the second end to move relative to the first body, the motion end rotates around the pivot end which served as a rotating axis to rotate away from the first body to expose the convection groove or rotate to get close to the first body to hide the convection groove.

3. The electronic device of claim 1, wherein the cover plate comprises a pivot end, a motion end opposite to the pivot end, and a sliding groove located between the pivot end and the motion end, the pivot end is pivoted to the first body, and the second end has a coupling portion, wherein the coupling portion is slidably disposed in the sliding groove, and the pivot end and a pivot point of the lever element on the fulcrum are respectively located at two opposite sides of the motion end.

4. The electronic device of claim 1, wherein a distance between a pivot point of the lever element on the fulcrum and the first end is smaller than a distance between the pivot point of the lever element on the fulcrum and the second end.

5. The electronic device of claim 1, wherein the driving element has a rotating axle centre and an abutting surface surrounding the rotating axle centre, and as the driving element rotates along with the second body, the abutting surface abuts against the first end through a plurality of different abutting points, and distances between each abutting point and the rotating axle centre gradually increase or decrease.

6. The electronic device of claim 5, wherein the abutting surface has an arc section, and distances between the plurality of abutting points on the arc section and the rotating axle centre are equal.

7. The electronic device of claim 1, wherein the first body comprises a base and a casing disposed on the base, and the driving element, the first end and the fulcrum are disposed between the casing and the base, the cover plate and the casing are arranged side by side, and the second end is located outside the casing.

8. The electronic device of claim 1, wherein the driving element has a rotating axle centre and an abutting surface surrounding the rotating axle centre, and as the driving element rotates along with the second body, the abutting surface abuts against the first end through a plurality of different abutting points sequentially, and distances between each abutting point and the rotating axle centre are equal.

9. The electronic device of claim 8, wherein the driving element comprises a protrusion portion protruding from the abutting surface, and a distance between the protrusion portion and the rotating axle centre is greater than a distance between each abutting point and the rotating axle centre.

10. The electronic device of claim 1, wherein the hinge structure further comprises a shaft and a positioning frame, the shaft connects the first body and the second body and is inserted into the driving element, the first gear and the positioning frame, wherein the positioning frame is connected to the fulcrum and fixed to the first body, the first gear and the second gear are pivoted to the positioning frame.

11. The electronic device of claim 1, wherein the hinge structure further comprises an elastic member having a first abutting end and a second abutting end that are opposite to each other, the first abutting end abuts against the lever element and the second abutting end abuts against the fulcrum.

12. An electronic device, comprising:
- a first body, having a convection groove and an accommodation groove;
- a hinge structure, disposed at the first body;
- a second body, pivoted to the first body through the hinge structure;
- a cover plate, movably disposed at the first body and configured to optionally hide the convection groove;
- a fulcrum, disposed at the first body;
- a lever element, pivoted to the fulcrum, wherein the lever element comprises a first end and a second end opposite to each other, the hinge structure abuts against the first end and the second end is movably coupled to the cover plate, wherein the lever element is configured to be driven by the hinge structure to rotate relative to the fulcrum and the cover plate is driven by the second end to move relative to the first body; and
- a stand, movably disposed at the first body, and the stand is configured to be driven by the hinge structure to move out of or back into the accommodation groove.

13. The electronic device of claim 12, wherein the hinge structure comprises a driving element and the driving element abuts against the first end.

14. The electronic device of claim 13, wherein the driving element has a rotating axle centre and an abutting surface surrounding the rotating axle centre, the abutting surface abuts against the first end through a plurality of different abutting points, and at least two of the abutting points keep two different distances from rotating axle centre.

15. The electronic device of claim 13, wherein the hinge structure further comprises a first gear and a shaft, the driving element and the first gear are arranged side by side at the first body, and the driving element and the first gear are sleeved on and fixed to the shaft.

16. The electronic device of claim 15, further comprising a second gear connected to the stand and coupled to the first gear.

17. The electronic device of claim 16, wherein the hinge structure further comprises a positioning frame, and the first gear and the second gear are arranged side by side in the positioning frame.

18. The electronic device of claim 17, wherein the driving element is located outside the positioning frame.

19. The electronic device of claim 13, wherein the driving element comprises a circular surface and a protrusion portion protruding from the circular surface, and the circular surface and the protrusion portion are configured to abut against the first end.

20. The electronic device of claim 13, wherein the driving element is a cam.

* * * * *